United States Patent [19]
Niki

[11] 4,450,788
[45] May 29, 1984

[54] CAGE FOR REARING SMALL ANIMALS FOR EXPERIMENTS

[75] Inventor: Motohiro Niki, Tokyo-To, Japan

[30] Foreign Application Priority Data

May 30, 1981 [JP] Japan .......................................... 56-80092

[21] Appl. No.: 380,308
[22] Filed: May 20, 1982
[51] Int. Cl.³ .............................................. A01K 7/00
[52] U.S. Cl. ..................................... 119/18; 119/72.5
[58] Field of Search .......................... 119/18, 17, 72.5; 220/326

[56] References Cited

U.S. PATENT DOCUMENTS

| | | | |
|---|---|---|---|
| 2,530,148 | 11/1950 | Bjorklund et al. | 119/17 |
| 2,613,014 | 10/1952 | Walsh et al. | 220/326 |
| 2,778,333 | 1/1957 | Babros et al. | 119/17 |
| 2,946,308 | 7/1960 | Harris | 119/72.5 |

*Primary Examiner*—Hugh R. Chamblee
*Attorney, Agent, or Firm*—Ladas & Parry

[57] ABSTRACT

A cage for small animals has on a wall thereof a mounting plate fixed thereto over an opening in the wall and a holding tube inserted through the mounting plate and fixed thereto with an inclination such that the spout of a water dispenser can be inserted from outside the cage through the holding tube and be thus held in a simple yet securely mounted state with the dispensing end thereof inside the cage. The cage also has a latch device comprising a ring-shaped catch fixed to outer face of a wall and projecting outward and a flexible coil spring fixed at its ends to the free edge of a door to form a closed loop, which is forced under tension to slip around the catch, over-riding the round lobe thereof.

4 Claims, 5 Drawing Figures

CAGE FOR REARING SMALL ANIMALS FOR EXPERIMENTS

BACKGROUND OF THE INVENTION

This invention relates generally to enclosures for confining animals, particularly small animals, and more specifically to improvements in the mounting of a drinking-water dispenser and the door latch of a wire-netting cage for rearing small animals for experiments.

In a wire-netting cage for rearing small animals of this kind known heretofore, the drinking-water dispenser is attached to the main structure of the cage by means of a band or strap or is placed on the main structure. In the former expedient, the work of attaching and detaching the water dispenser is troublesome, while in the latter expedient, the water dispenser becomes an obstruction when a plurality of cages are to be used in stacked state. In known cages, furthermore, water dispensers are frequently dislodged or caused to leak by impact force due to contact or movements of the animals enclosed in the cages.

Still another problem encountered in known cages is that of positively latching access doors with a latch mechanism of simple construction and reliable and simple operation. Known latch mechanisms are subject to unlatching due to shaking of the cages by the occupant animals or, if of a positive latching action, cannot be easily operated in latching, unlatching, or both.

SUMMARY OF THE INVENTION

It is an object of this invention to provide a cage for rearing small animals for experiments in which cage the above described problems have been overcome.

According to this invention, briefly summarized, there is provided a cage for rearing small animals which has an access door and walls and is characterized by the combination therewith of a mounting device comprising a mounting plate fixed to a wall to cover an opening in the wall and a holding tube inserted through a hole in the mounting plate and fixed opening and fixed to the mounting plate with an inclination such that the spout of a water dispenser can be inserted from outside the cage through the holding tube and be thus held in mounted state with the dispensing end of the spout inside of the cage.

The nature, utility, and further features of this invention will be more clearly apparent from the following detailed description when read in conjunction with the accompanying drawings, briefly described below.

DETAILED DESCRIPTION OF THE INVENTION

Figure 1:
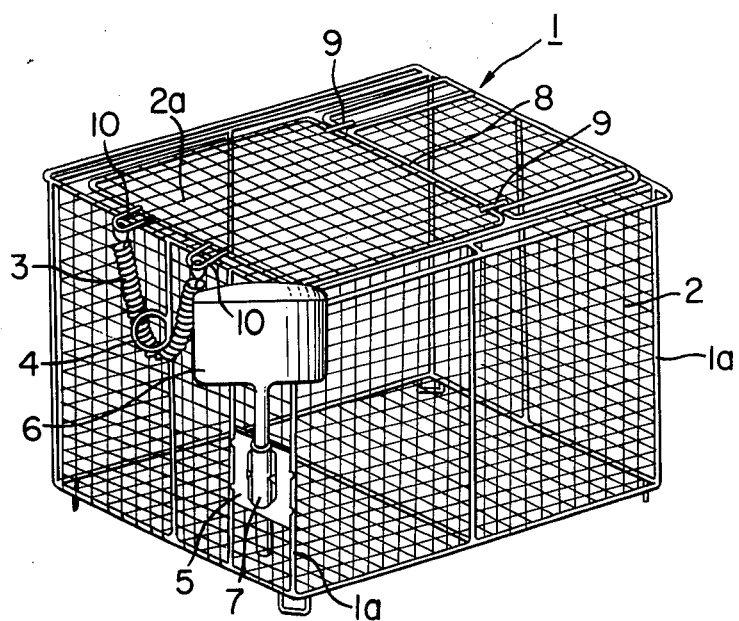
FIG. 1 is a perspective view of one example of a small animal rearing cage according to this invention.
Figure 2:
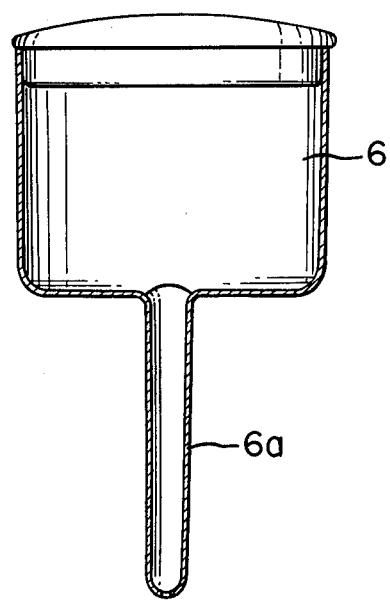
FIG. 2 is an elevation, in vertical section, showing one example of a drinking water dispenser suitable for use in the cage of the invention.

Referring to FIG. 1, the cage 1 for rearing small animals shown therein has a frame structure 1a made of relatively thick metal wire and wire netting 2 covering the entire frame and constituting the ceiling, four side walls, and floor of the cage. This cage 1 has an access door 2a which is of the hinged, swinging type.

Figure 3:
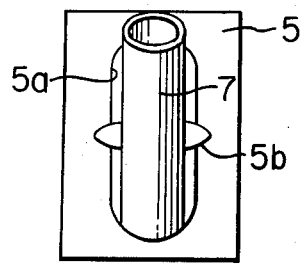
FIG. 3 is a relatively enlarged front elevation of a water dispenser holding tube and a mounting plate supporting the holding tube and attached to a side wall of the cage so that the spout of the water dispenser can be inserted through and held by the holding tube.
Figure 4:
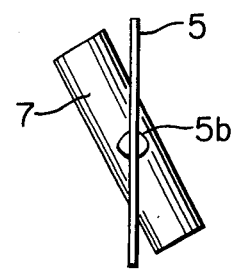
FIG. 4 is a side elevation, orthogonal to FIG. 3, of the mounting plate and the holding tube.
Figure 5:
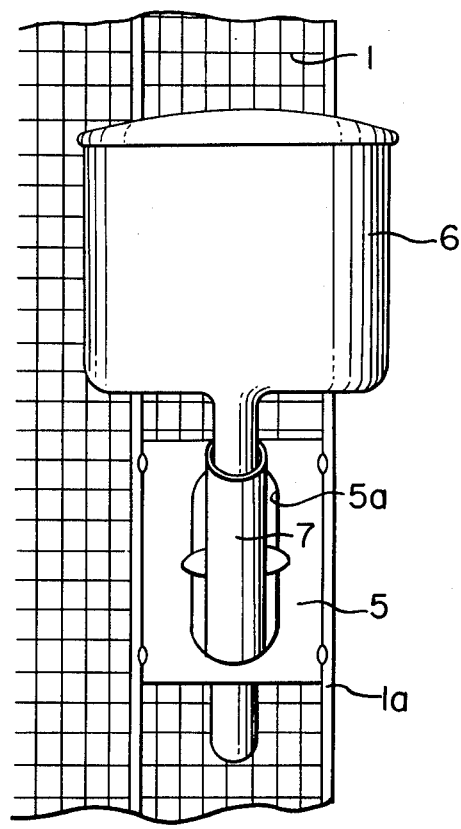
FIG. 5 is a relatively enlarged front view showing the state wherein the water dispenser is mounted on the side wall of the cage, the spout of the water dispenser being inserted through and held by the holding tube.

A small portion of the wire netting 2 of one side wall, preferably a front wall to face a caretaker or laboratory worker, is cut out to form an opening, over which a mounting plate 5 having a vertical elongated hole 5a is fixed to members of the frame structure 1a as shown in FIG. 5. As shown in the FIGS. 3 and 4, the mounting plate 5 supports a holding tube 7 previously inserted through the hole 5a and fixed to the plate at 5b with an inclined orientation such that the spout 6a of a drinking-water dispenser 6 can be easily inserted from the outside through the holding tube 7 to be held thereby with the lower tip of the spout on the inner side of the cage 1.

The water dispenser 6 is not limited to that illustrated in the drawings, which is but one example, but may be any of various kinds, including those which dispense water in small quantities every time a small animal nudges their lower, dispensing ends. The holding tube 7 is so adapted to the one or more kinds of water dispensers to be used that the lower tip will project only about 10 to 15 mm beyond the lower end of the holding tube into the cage and certainly not to the floor of the cage. Thus, the holding tube 7 and the mounting plate 5 constitute a very effective and reliable mounting device of simple construction for holding a water dispenser in operational state.

The aforementioned access door 2a is hinged at its one edge 8 by hinge members 9 along a line intermediate between front and back walls of the cage 1. Its opposite free edge is adapted to be closed against the upper part of the front wall.

According to this invention, this door is openably closed and then retained in closed or latched state by a simple latch device comprising a catch 4 of ring shape rigidly fixed to a member of the frame structure 1a at a position on the outer side of the front wall a certain distance from its upper part and projecting perpendicularly away from the front wall and a spring latch 3 in the form of a coil spring of a suitable length anchored at its two ends to respective spaced-apart parts 10 on the front free edge of the door 2a. To latch the door 2a, the spring latch 3, which thus has a U-shaped figure, is pulled downward and slipped under the catch 4 and then toward the front wall, overriding the rounded lower part of the ring-shaped catch 4 constituting a sort of dead-center member, whereby a click motion or snap motion is attained.

Thus, as described above, this invention provides means of very simple construction for rapidly and easily mounting and demounting with one hand a water dispenser on and from a cage for small laboratory animals. This is a distinct advantage in cases where a great number of cages must be attended to. Once the water dispenser is mounted in place, it cannot be dislodged by actions or vigorous movements of the one or more animals occupying the cage. Even if an animal should push upward on the lower end of the spout of the water dispenser, the water dispenser cannot be raised to an exent such that it will be demounted and drop off from the cage because the spout tip projects only a short distance beyond the lower end of the holding tube.

This invention further provides a latch mechanism of simple construction which can be operated easily by one hand in a simple motion to latch or unlatch the access door. Because the spring latch is caused to override the lower lobe of the ring-shaped catch, it is caught and retained positively and relatively by elastic force in latched state, from which it cannot be unlatched by any vigorous action or movement of the caged animal or animals. Furthermore, because of the simple construction and operation of this latch mechanism, it has great durability affording a long serviceable life.

While this invention has been described with respect to one example thereof as applied to a cage having a ceiling, four walls, and a floor all covered by wire netting, the invention is not intended to be thus limited, it being applicable to a great variety of other kinds of cages with various other types of construction.

What I claim is:

1. In a cage for rearing small animals which has an access door and walls, the combination therewith of a water dispensing device comprising a mounting plate fixed to a wall to cover an opening in the wall and having a vertical elongated hole, a straight holding tube of uniform cross section inserted through the elongated hole and fixed to the mounting plate at the two longitudinal edges of the hole with an inclined orientation such that the holding tube extends obliquely upward outside the cage and obliquely downward inside the cage, and a water dispenser made up of a water container and a spout projecting from the container and terminating at a dispensing end, said spout being removable and slidably inserted from outside the cage through the holding tube and held in mounted state with the dispensing end thereof projecting slightly beyond the lower end of the holding tube.

2. The combination as claimed in claim 1 in which the cage has at least one wall which is made of wire and wire netting, and to which the mounting plate is fixed.

3. The combination as claimed in claim 1, further comprising a latch device including a catch with a round lobe fixed to the outer face of a wall of the cage and projecting outwardly therefrom, and a flexible coil spring fixed at the two ends thereof to the access door at spaced apart positions thereof to form a closed loop, said coil spring having convolutions engaging under tension said catch at the intermediate portion of the spring between the two ends thereof in the latching state of the latch device whereby the coil spring assumes a triangular shape in the latching state and when the coil spring is pulled and elongated manually it can be disengaged from the catch.

4. The combination as claimed in claim 3 in which the catch is ring-shaped.

* * * * *